United States Patent
Chen et al.

(10) Patent No.: US 7,835,247 B2
(45) Date of Patent: Nov. 16, 2010

(54) BACKUP METHOD OF RECORD INFORMATION AND METHOD FOR READING BACKED UP RECORD INFORMATION

(75) Inventors: Shih-Kuo Chen, Taoyuan County (TW); Chin-Fa Hsu, Taoyuan County (TW); Shiu-Ming Chu, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 511 days.

(21) Appl. No.: 11/871,160

(22) Filed: Oct. 12, 2007

(65) Prior Publication Data
US 2008/0130457 A1    Jun. 5, 2008

(30) Foreign Application Priority Data
Nov. 30, 2006    (TW) .............................. 95144625 A

(51) Int. Cl.
*G11B 7/00*    (2006.01)
(52) U.S. Cl. .................................. 369/59.25; 369/47.44
(58) Field of Classification Search .............. 369/47.44, 369/53.11, 53.45
See application file for complete search history.

(56) References Cited

U.S. PATENT DOCUMENTS

2002/0025139 A1* 2/2002 Haino et al. ................... 386/95
2004/0264322 A1* 12/2004 Shishido et al. ........... 369/47.22

\* cited by examiner

*Primary Examiner*—Wayne R Young
*Assistant Examiner*—Adam R Giesy
(74) *Attorney, Agent, or Firm*—Winston Hsu; Scott Margo

(57) ABSTRACT

A backup method includes reading record information of an optical disc; when the reading operation fails, utilizing an optical disc drive to read backed up record information at a plurality of specified positions in the lead-out area; checking a status of a session as a preparation for following recording; utilizing the optical disc drive to record data into a session on the optical disc; updating record information of the optical disc to generate an updated record information when recording of the session is completed and simultaneously recording the updated record information including a TOC block within the lead-in area of the optical disc to a plurality of specified positions on the optical disc according to different data types of the record information to serve as backed up record information; and ending a recording operation of the session.

16 Claims, 3 Drawing Sheets

BACKUP METHOD OF RECORD INFORMATION AND METHOD FOR READING BACKED UP RECORD INFORMATION

BACKGROUND OF THE INVENTION

1. Field of the Invention

The present invention relates to reading data from an optical disc and recording data onto the optical disc, and more particularly, to methods of establishing a backup of each record information simultaneously when recording the record information onto the optical disc, and utilizing the backup record information to read the optical disc or record to the optical disc continuously when normally reading the record information from the optical disc fails.

2. Description of the Prior Art

Write-once discs belong to disc types capable of merely recording data once. That is, to delete a pre-recorded data from the write-once disc in order to record new data is unfeasible. For the above-mentioned reason, every time before a record operation is started, both a position of a latest closed session and a present status of the write-once disc indicating that it is not finalized need to be checked respectively for recording a new session continuously without overwriting or damaging the pre-recorded data on the write-once disc.

Please refer to FIG. 1. FIG. 1 is a flowchart illustrating a conventional loading operation of the write-once disc according to the prior art. In Step 1, the write-once disc is loaded into an optical disc drive and the optical disc drive reads data within a lead-in area for identifying that the type of the loaded optical disc is actually a write-once disc. In Step 2, the optical disc drive sequentially reads data stored in a plurality of control data corresponding to respective sessions on the write-once disc. In Step 3, the optical disc drive reads major record information of the write-once disc. The major record information is stored in several areas including Table of Content (TOC) areas, Session Disc Control Blocks (SDCBs), and Control Data (CD) areas, etc. The major record information stores total amount, positions, lengths, and status of sessions/fragments and physical format information of the write-once disc, and the major record information therefore affects a following recording operation of the write-once disc. When reading of the above-mentioned major record information fails, causing the identification of position and status of a closed session by previous recording is not possible the optical disc drive then performs Step 4. In Step 4, the optical disc drive determines that the loaded optical disc is finalized and thus recording new sessions onto the write-once disc is unfeasible. On the other hand, when the reading operation in Step 3 is successful, the flow will proceed to Step 5. In Step 5, the optical disc drive checks the position and the status of the latest closed session on the write-once disc through the latest data included in the major record information. The operation in Step 5 is implemented as a preparation for following recording or for setting the write-once disc as finalized. In Step 6, the optical disc drive keeps reading other data stored in the lead-in area on the write-once disc. In Step 7, the loading flow of the write-once disc is completed.

The conventional recording operation therefore takes a reading result of the major record information within the lead-in area on the write-once disc as a necessary condition for execution. However, in a conventional loading operation of the write-once disc, there is no backup of the major record information in other areas on the write-once disc. When demand for multi-times continuous recording occurs or when the write-once disc is damaged or scratched, the recording quality at this time is not stable, resulting in reading failure of the major record information. The optical disc drive is therefore unable to check the position and status of the latest closed session and fails to record new data onto the write-once disc continuously even though there is still storage space available for recording data. This wastes storage space on the write-once disc. From the above description, solving the recording problems due to reading failure of the major record information of the write-once disc is an important issue.

SUMMARY OF THE INVENTION

It is therefore one of the objectives of the present invention to provide a backup method of record information and a method for reading the backup record information by backing up the major record information to a plurality of specified positions within a lead-out area on a write-once disc when recording the record information onto the optical disc, and utilizing the backed up record information to read the optical disc or record to the optical disc continuously when normally reading of the record information from the optical disc fails, in order to solve the above problems.

According to one aspect of the present invention, a backup method and method of reading the backup record information is disclosed. The backup method includes firstly reading record information of an optical disc; when the reading operation fails, an optical disc drive therefore reading a backed up record information at a plurality of specified positions in the lead-out area; then checking a status of a session as a preparation for following recording; then the optical disc drive record data into a session on the optical disc; updating the record information of the optical disc to generate an updated record information when recording of the session is completed and simultaneously recording the updated record information including a TOC block within an inner drive area, control data of a lead-in area and a session disc control block (SDCB) within the lead-in area of the optical disc to a plurality of specified positions on the optical disc respectively according to different data types of the record information to serve as backed up record information; and then ending a recording operation of the session.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
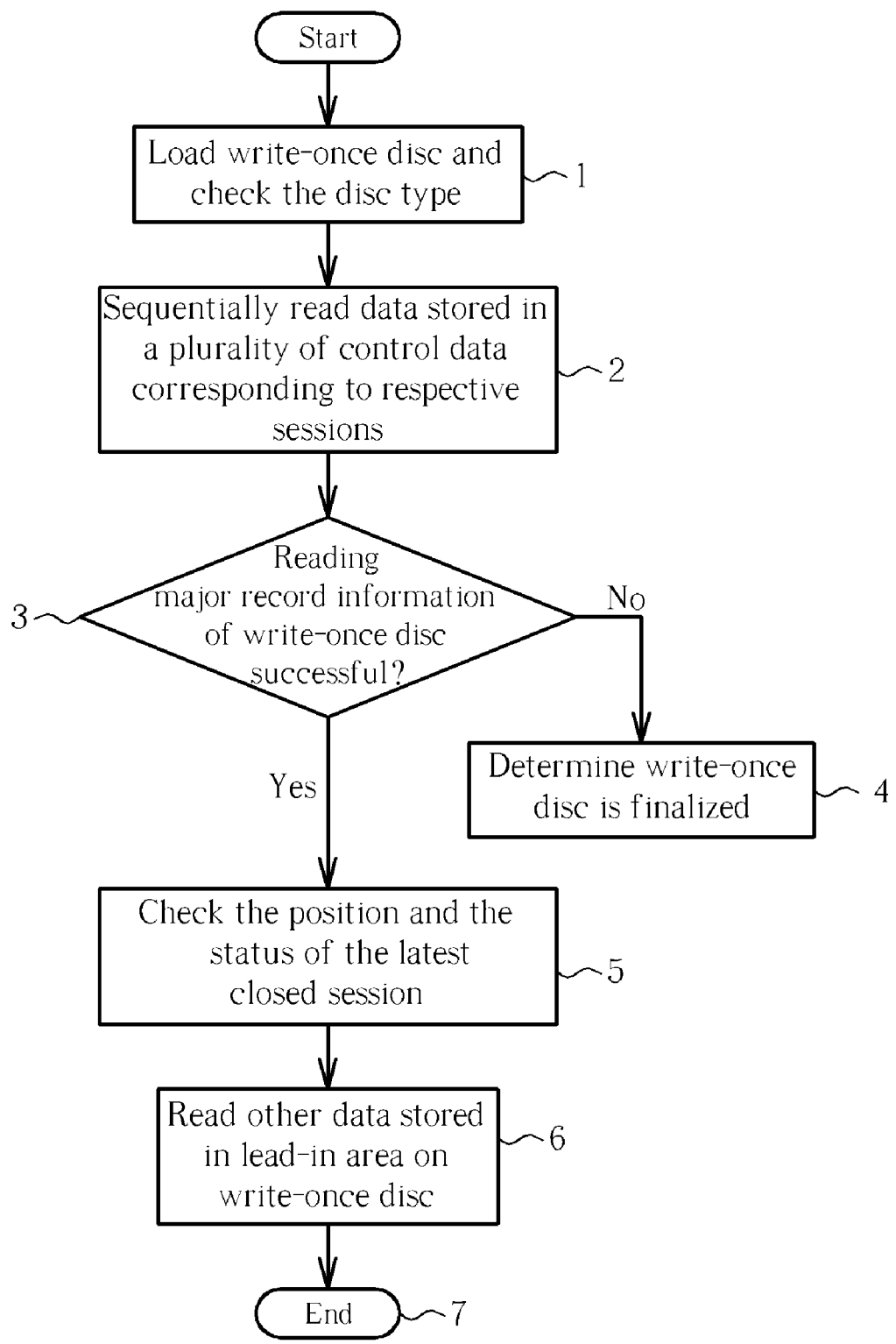
FIG. 1 is a flowchart illustrating a conventional loading operation of a write-once disc.
Figure 2:
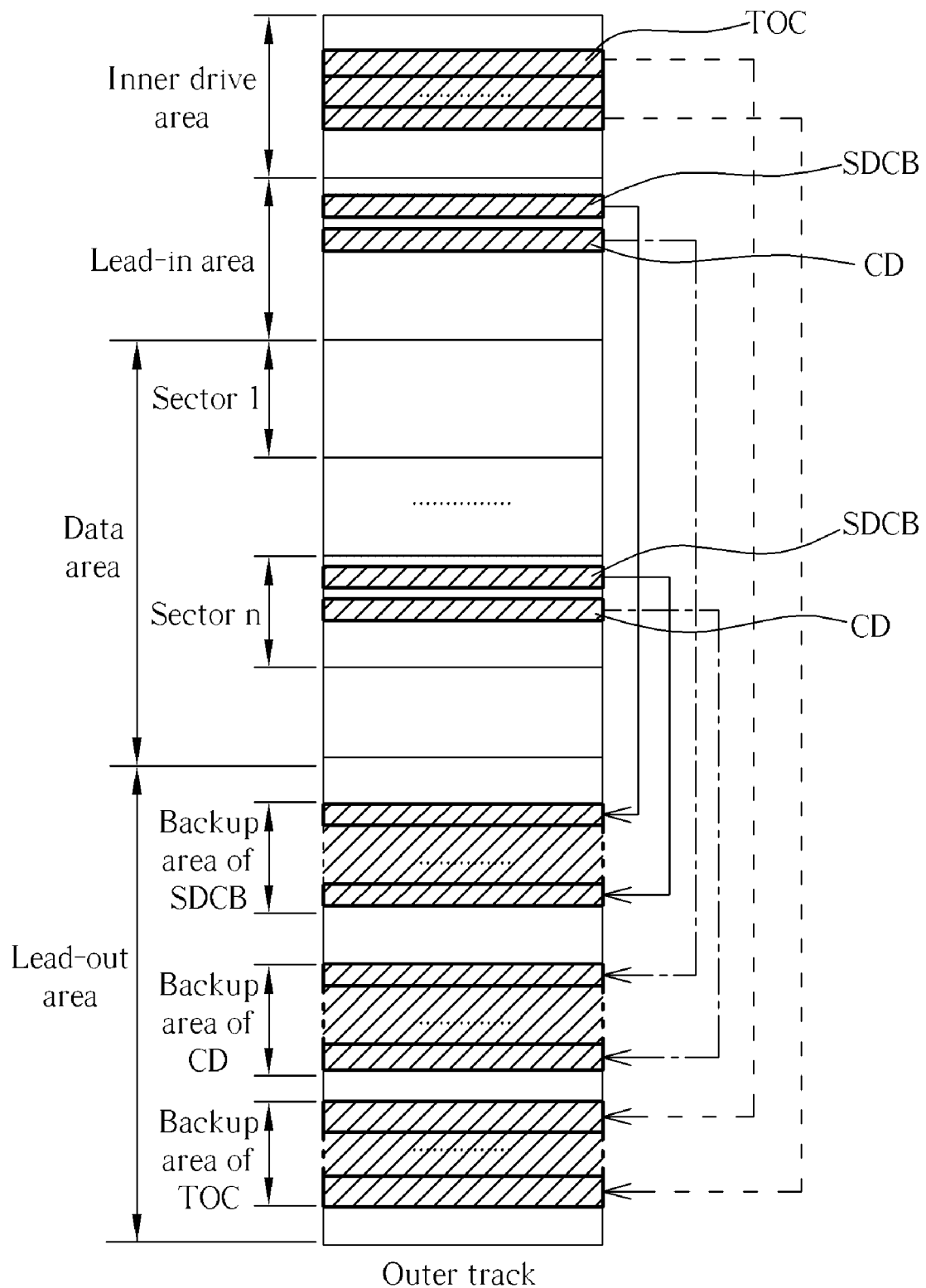
FIG. 2 is a diagram illustrating a data structure of a DVD+R write-once disc.

Please refer to FIG. 2. FIG. 2 is a diagram illustrating a data structure of a DVD+R write-once disc. The data structure of the write-once disc from an inner track to an outer track includes an inner drive area, a lead-in area, a data area, and a lead-out area, etc. The inner drive area has a TOC block used for recording information related to a closed session following every recording session on the write-once disc. The lead-in area has an SDCB (Session Disc Control Block) and a Control Data (CD) area therein. The information stored in the SDCB and CD areas records total amount, positions, lengths, and status of sessions/fragments and physical format information of the write-once disc. The data area is implemented as a storage area for storing user data, and supports multi-times sequential recordings. Every recording generates a session and therefore forms a multi-session status. Each session of the write-once disc has an SDCB block and a control data block. The lead-out area is positioned at an outer track of the write-once disc. When storage space within the data area of the write-once disc is completely used or when the write-once disc is set as finalized, the optical disc drive at this time records information including a lead-out area ID into the lead-out area of the write-once disc to indicate existence of the lead-out area, to thereby forbid recording more data into the write-once disc.

Regarding the normal disc recording, when a session has been recorded in the data area on the write-once disc, information related to the closed session is recorded in the inner drive area complying with a standard of the write-once disc, thereby forming information of the TOC block, and additionally, records an SDCB block and a CD in the closed session as a preparation for the successive recording. When recording the aforementioned information, the disclosed backup method of record information and the method of reading the backed up record information thereof simultaneously records the SDCB blocks in the lead-in area and sessions of the data area to first specific positions (as indicated by solid lines in FIG. 2) within the lead-out area, respectively; and recording the DC blocks in the lead-in area and sessions of the data area to second specified positions (as indicated by dot-dash lines in FIG. 2) within the lead-out area, respectively; and further recording the updated information of the TOC block in the inner drive area to third specified positions (as indicated by dashed lines in FIG. 2) within the lead-out area. The above information recorded within the lead-out area forms a backup of the major record information, where positions of the first, second and third specified positions do not affect recording of the lead-out ID in the lead-out area or can be overwritten by the recorded lead-out ID.

Therefore the disclosed backup method of record information and the method of reading the record information backed up thereof mark out a plurality of specified positions within the lead-out area on the write-once disc to serve as a plurality of backup areas respectively for the SDCB blocks, the TOC blocks, etc. The backed up major record information is individually record into the backup areas according to data type thereof, and in the same backup area the backup blocks of the major record information are successively record in an original recording order thereof in the write-once disc. By using the aforementioned operations, when the optical disc drive records data onto the write-once disc, even if the TOC block within the lead-in area cannot be read due to being damaged or scratched, the optical disc drive reads the backed up major record information respectively from the first, second, and third specified positions in the lead-out area to successfully obtain the desired record information to continue recording data to the optical disc.

Figure 3:
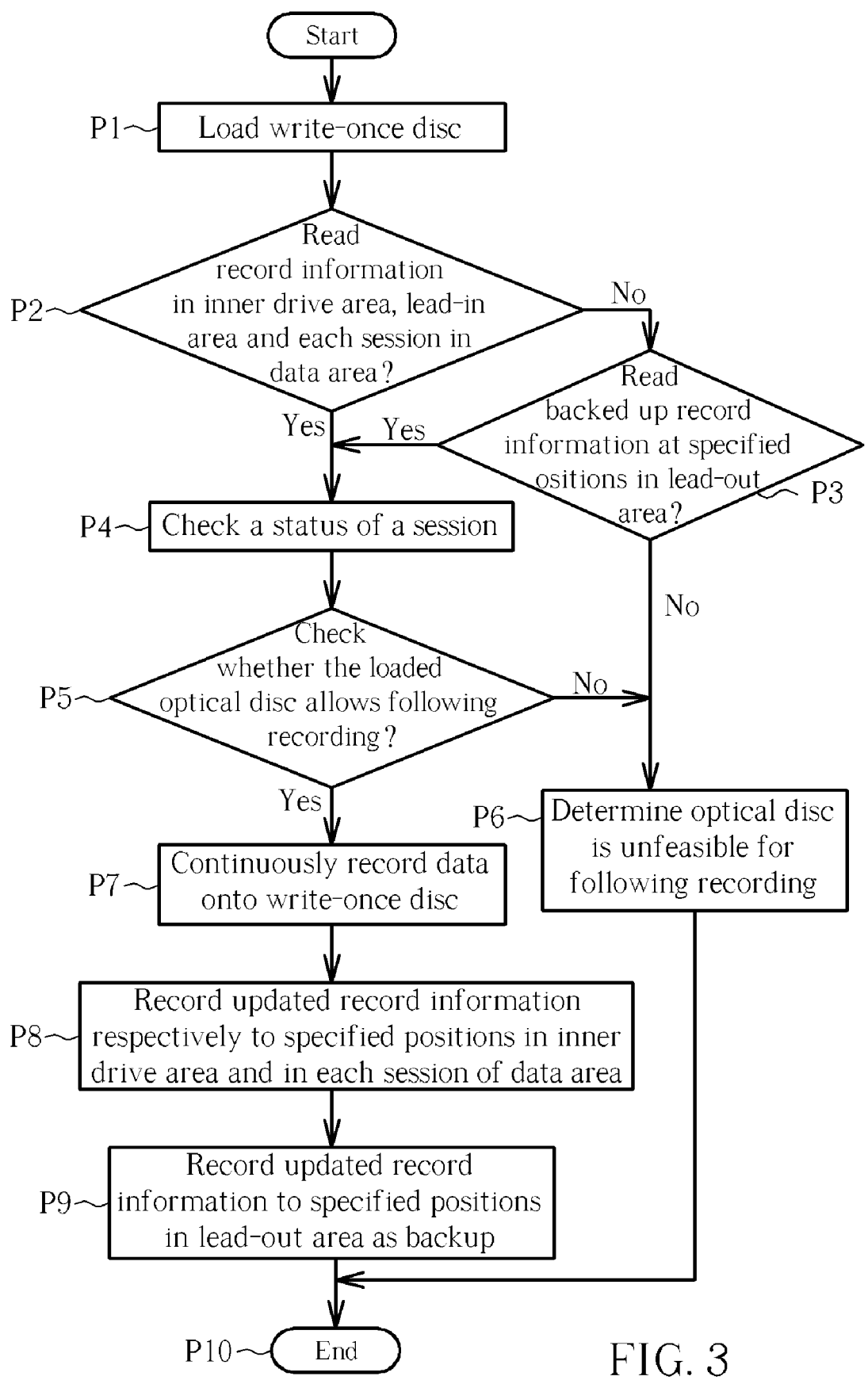
FIG. 3 is a flowchart illustrating a recording and reading flow of the major record information on the write-once disc according to an embodiment of the present invention.

FIG. 3 is a flowchart illustrating a recording and reading flow of the major record information on the write-once disc according to an embodiment of the present invention. The detailed steps are as follows:

Step P1: An optical disc drive loads a write-once disc to proceed with a recording operation.

Step P2: The optical disc drive reads record information respectively in an inner drive area, a lead-in area and each session in data area as a preparation for following recording; when the reading operation succeeds, go to Step P4; when the reading operation fails, go to Step P3.

Step P3: The optical disc drive reads backed up record information at specified positions in the lead-out area to obtain the correct record information; when the reading operation succeeds, go to Step P4; when the reading operation fails, go to Step P6.

Step P4: The optical disc drive checks a status of a session as a preparation for following recording by using the record information read from Step P3.

Step P5: The optical disc drive checks whether the loaded optical disc allows following recording by checking if the optical disc is finalized; when the optical disc is finalized, go to Step P6; otherwise, go to Step P7.

Step P6: The optical disc drive determines that the optical disc is unfeasible for following recording when no record information is available or when the write-once disc is finalized; go to Step P10.

Step P7: The optical disc drive continuously records data onto the write-once disc.

Step P8: The optical disc drive records the updated record information respectively to specified positions in the inner drive area and in each session of the data area after the recording operation in Step P7 is completed.

Step P9: The optical disc drive records the updated record information to specified positions in the lead-out area as a backup.

Step P10: The recording flow is completed.

Based on the above disclosure, the disclosed backup method of record information and the method of reading the record information backed up thereof are capable of storing backed up record information in the lead-in area and in each session of data area into the specified positions in the lead-out area to allow further recording and reading the write-once disc by utilizing the optical disc drive to read the backed up record information from the specified positions in the lead-out area when reading of the original record information from the optical disc fails.

Those skilled in the art will readily observe that numerous modifications and alterations of the device and method may be made while retaining the teachings of the invention.

What is claimed is:

1. A method of backing up record information and reading backed up record information, comprising following steps:
   (a) reading record information of an optical disc;
   (b) recording a session on the optical disc;
   (c) updating the record information of the optical disc to generate an updated record information when recording of the session is completed;
   (d) recording the updated record information to at least a specified position on the optical disc to serve as backed up record information; and
   (e) ending a recording operation of the session;
   wherein the backed up record information in Step (d) comprises recording information separately stored in an inner drive area, a lead-in area, and the lead-out area on the optical disc; and the backed up record information is recorded separately at a plurality of specified positions in the lead-out area of the optical disc.

2. The method of claim 1, further comprising:
   (a-1) when Step (a) fails to read the record information from the optical disc, reading the backed up record information from the specified position.

3. The method of claim 2, wherein when Step (a-1) succeeds in reading the backed up record information from the specified position, the method proceeds with Step (b); and when Step (a-1) fails to read the record information from the specified position, the method proceeds with Step (e) to end the recording operation.

4. The method of claim 1, wherein Step (b) comprises:
- checking a status of each session on the optical disc to determine whether the optical disc allows for recording new data thereon before starting recording the session on the optical disc; and
- when the optical disc allows for recording new data, proceeding with recording the session; otherwise, proceeding with Step (e) to end the recording operation.

5. The method of claim 4, wherein checking the status of each session on the optical disc determines whether the optical disc is finalized or not.

6. The method of claim 1, wherein the specified positions are recorded separately according to data types of the backed up record information.

7. The method of claim 6, wherein the backed up record information is stored in the specified positions continuously according to a recording order of the record information on the optical disc.

8. The method of claim 1, wherein the specified positions comprise a first specified position, a second specified position and a third specified position within the lead-out area.

9. The method of claim 1, wherein the backed up record information in Step (d) comprises a backup of a session disc control block (SDCB) within the lead-in area of the optical disc.

10. The method of claim 9, wherein the backup of the SDCB is recorded at the first specified position in the lead-out area.

11. The method of claim 1, wherein the backed up record information in Step (d) comprises control data (CD) within the lead-in area of the optical disc.

12. The method of claim 11, wherein the backup of the CD within the lead-in area of the optical disc is recorded at the second specified position in the lead-out area.

13. The method of claim 1, wherein the backed up record information in Step (d) comprises a backup of an updated table of content (TOC) block within the inner drive area.

14. The method of claim 13, wherein the updated TOC block is recorded at the third specified position in the lead-out area.

15. The method of claim 1, wherein the optical disc is a write-once disc.

16. The method of claim 15, wherein the optical disc is a DVD+R disc.

* * * * *